VARIABLE TIME CONSTANT PULSE INTEGRATOR

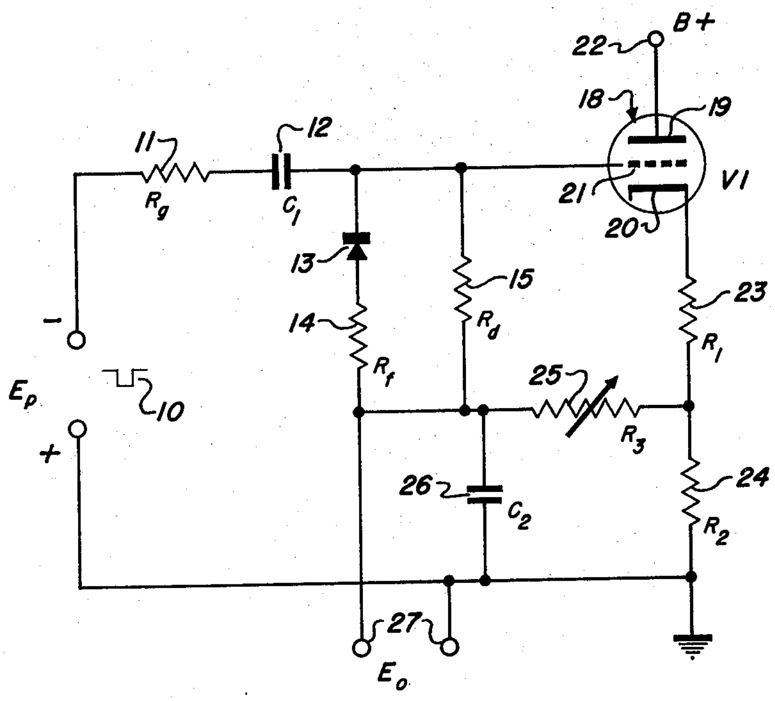
INVENTOR
George W. Rodgers
BY
Roland A. Anderson
Attorney 3,189,833

George W. Rodgers, Albuquerque, N. Mex., assignor, by mesne assignments, to the United States of America as represented by the United States Atomic Energy Commission Filed Apr. 7, 1961, Ser. No. 101,606
2 Claims. (Cl. 328—58)

This invention relates to a resistance-capacitance type of integrating circuit and has reference to a circuit of this type designed to integrate a series of unidirectional pulses in which the integration time can be varied over a wide range. In particular, the invention describes an electrical circuit comprising a unique combination of capacitor-resistance pulse stretching network with a capacitor-resistance pulse integrating network including an active element, introducing power gain into the circuit.

The pulse integrator to be described has three distinct advantages over conventional passive pulse integrating circuits. In the first place, its integration time can be varied to an essentially unlimited degree without any effect on the steady state gain or output voltage. Furthermore, its effective integration time is greater than the physical RC time constant by a calculable gain factor, thus permitting the use of smaller capacitors for a given integration time. And, finally, although it multiplies the physical integration time constant by using what is, in effect, a positive feedback, the circuit is at the same time rendered highly stable by the inclusion of negative feedback.

It is therefore a general object of this invention to provide a pulse integrating circuit which includes the advantages over the prior art enumerated above.

Another object of this invention is the provision of a pulse integrator which can provide maximum pulse-to-D.C. conversion with a minimum number of components.

A further object of the invention is to provide a pulse integrator in which the pulse-to-pulse amplitude relationship of an input pulse train having a random pulse amplitude variation is preserved.

Another object of the invention is to provide a pulse integrator in which the effective integration time is easily adjustable over a wide range.

Still another object of this invention is the provision of a pulse integrator having an appreciably larger gain than that obtainable from a passive pulse integrating circuit.

Still further and other objects of the invention will be apparent by reference to the following description taken in conjunction with the attached circuit diagram of this pulse integrator.

Referring now to the diagram, we shall assume a source of undirectional voltage pulses 10 having a known peak voltage value $E_p$, a pulse width $\delta$, and a repetition rate or pulse period T. For the purposes of the present illustration, these pulses are shown as negative-going; however, it will be apparent that with suitable rearrangement of circuit components it would be equally well adapted to positive-going pulses.

We may assume typically that the pulse width of the incoming pulses is short with respect to the pulse period. Connected to the negative terminal of the voltage input is a pulse stretching network which may generally be considered to include the effective series resistance 11($R_g$) of the voltage source, pulse stretching capacitor 12($C_1$), a unidirectional element, for example, diode 13 having forward resistance 14($R_f$), and discharge resistor 15($R_d$). As will be observed below, it is the primary function of this pulse stretching network to achieve a given pulse-to-D.C. gain at the grid input of the integrator-amplifier to be described.

Electron tube 18($V_1$) includes anode 19, cathode 20, and control electrode 21. The anode is connected to some suitable source of positive potential or B+ voltage 22. Control electrode 21 is connected to the output of the pulse stretching network at the positive terminal of capacitor 12. Resistors 23($R_1$) and 24($R_2$) are connected in series between cathode 20 and ground potential. The integrating time constant network of the pulse integrator consists of a variable resistor 25($R_3$) connected between one terminal of capacitor 26($C_2$) and the junction of resistors 23 and 24, while the other terminal of capacitor 26 is connected to ground potential. It is now apparent that diode 13 and discharge resistor 15 form a parallel network connected between capacitor 12 and the junction of variable resistor 25 and capacitor 26. Suitable voltage output means 27 may be connected to the junction of resistor 25 and capacitor 26.

The operation of this circuit can best be understood in mathematical terms and will be discussed in that aspect. The derivation of the mathematical expressions employed herein is well within the competence of persons skilled in the electronics arts and it is therefore considered unnecessary to burden the present discussion with the details thereof. The over-all gain of this pulse integrator can be expessed as follows:

$$\text{Gain}=\frac{\Delta E_0}{E_p}=G_1\times G_2=\frac{T_d}{T}\frac{\left(1-\epsilon-\frac{\delta}{T_c}\right)\left(1-\epsilon-\frac{T}{T_d}\right)}{\left[1-\epsilon-\left(\frac{\delta}{T_c}+\frac{T}{T_d}\right)\right]}\times\frac{\mu R_2}{(\mu R_1+r_p)} \quad (1)$$

where:

$\Delta E_0$=output voltage
$E_p$=peak pulse amplitude of the input voltage
$G_1$=pulse-to-D.C. conversion of the pulse stretcher
$G_2$=D.C. gain of the integrator-amplifier
$T_c=(R_g+R_f)C_1$, charging time-constant
$T_d=(R_d+R_g)C_1$, discharging time-constant
$\mu$=amplification factor of $V_1$
$r_p$=dynamic plate resistance of $V_1$ It is assumed in the above equation and in those to follow that $\delta<<T$, $C_2>>C_1$, and $(\mu+1)\cong\mu$, which is the usual case.

It can be seen from the above equation that the overall pulse-to-D.C. gain is the product of two individual gain terms, $G_1$ and $G_2$. The function of the pulse stretching network is to achieve a controllable pulse-to-D.C. conversion at the grid input of the amplifying tube to be described. This may be done by efficient choice of values for capacitor 12($C_1$) and discharge resistor 15($R_d$). The charge path for capacitor 12 is through capacitor 26, the relatively small resistance of diode 13 and effective source resistance 11. Diode 13 is biased or oriented in a forward direction, therefore, with respect to this charge path. The discharge path for capacitor 12 is through resistance 11 and relatively large discharge resistor 15 and capacitor 26. As a practical matter, resistor 15 may usually be given a value of 1 megohm, since maximum pulse-to-D.C. conversion efficiency will be achieved with the greatest possible ratio of $R_d+R_g$ to $(R_g+R_f)$, which is the ratio of the discharging to charging time constants of the pulse stretching network. It is understood throughout that the latter two named resistors represent effective quantities and not separate physical components. The relatively large size of capacitor 26 insures that the charging current essentially bypasses resistors 24 and 25.

Within the scope of this invention it may be of interest not to provide the maximum pulse-to-D.C. conversion but rather to preserve the pulse-to-pulse amplitude relationship of an input pulse train 10 having a random pulse amplitude variation. In such case it is necessary that the pulse stretcher discharge time constant be about one-fifth of the pulse repetition period. Thus it can be stated that for maximum pulse-to-D.C. conversion, $$C_{1\ \text{optimum}}=\frac{\delta}{(R_g+R_f)} \qquad (2)$$

For following random amplitude fluctuations of the input pulse train with high fidelity, $$C_1 \cong \frac{T}{5R_d} \qquad (3)$$

For compromise purposes, it may be expedient to select a value for capacitor 12($C_1$) which falls between the above two extremes.

Once the desired operation of the pulse stretcher has been determined and the gain term $G_1$ is evaluated, the characteristics and constants of the remainder of the circuit are also determinable by considering the over-all gain desired.

Tube 18($V_1$) constitutes a non-inverting amplifier in that the output seen at the junction of resistors 23 and 24 is in phase with the input on control electrode 21. It is, however, not a cathode follower since the signal on the control electrode 21 does not represent a potential with respect to ground and thus a gain of greater than 1 is possible. Tube 18 amplifies the stretched pulse with a gain factor $G_2$, which is given by the second factor in the righthand side of gain Equation 1 above. The type of tube and the operating point chosen will determine $\mu$, $r_p$, and $R_1$ once the required value of $G_2$ is known by comparison of $G_1$ and desired over-all gain. The value of $R_2$ may then be found by solving an expression for $R_2$ as follows:

$$R_2=\left(\frac{\mu R_1+r_p}{\mu}\right)G_2 \qquad (4)$$

While the output of tube 18 appearing between resistors 23 and 24 is an amplified version of the output of the pulse stretcher, the signal appearing at the junction of resistor 25 and capacitor 26, which is in reality the same as the output signal 27, is an exponentially increasing wave form, which is to be expected since it represents the charge path of capacitor 26. The effective integration time of capacitor 26 is given by the equation:

$$RC_{eff}\left[\frac{\mu(R_1+R_2(+r_p)}{\mu R_1+r_p}\right]R_3C_2 \qquad (5)$$

where $RC_{eff}$ represents the effective integration time. It is noted that $RC_{eff}$ is greater than the product of $R_3$ and $C_2$ by the multiplication factor:

$$\frac{\mu(R_1+R_2)+r_p}{\mu R_1+r_p} \qquad (6)$$

As will be seen in a practical example to follow, this factor will enable a designer with the aid of this circuit to provide an effective integration time three or four times that of the actual RC time constant. Obviously variable resistor 25 can be adjusted to increase both the actual RC time constant and the effective integration time. This has the added advantage that it permits maintenance of a physically small component size for capacitor 26, which under many conditions may be of great importance. Observe also that variation in the values of resistor 25 or capacitor 26 does not affect the steady state gain of the circuit whose parameters are given in Equation 1 above.

It will be understood that the connection of cathode 20 through resistor 23, resistor 25 and resistor 15 which serves the dual function of capacitor-discharge resistor and grid-leak resistor, provides to the circuit an element of negative feedback. Tube 18 which will typically be biased just above cutoff in a static condition will, of course, conduct more heavily in the presence of the pulse stretched signal on control electrode 21. The potential at cathode 20 will accordingly rise and tend to decrease the control electrode-to-cathode potential difference. Simultaneously, however, with this negative feedback effect, a positive feedback effect is also introduced. The signal appearing between resistor 23 and resistor 24 in the presence of a stretched pulse on control grid 21 is in phase therewith but amplified by a factor $G_2$. This amplified signal combined with the original signal at control electrode 21 through the medium of the exponentially increasing potential between resistor 25 and capacitor 26 operates to further increase the amplification produced by tube 18. With reference to Equation 5, it can be observed from the bracketed factor thereof that this permits multiplication of the effective physical integration time constant of the circuit while not surrendering the stability thereof.

To illustrate the operation of the circuit of this invention, let us consider the specific case of a pulse train input with the following characteristics:

Peak pulse amplitude $E_p=-10$ v.
Pulse width $(\delta)=1\times10^{-6}$ sec.
Pulse repetition period $T=100\times10^{-6}$ sec.
Pulse source resistance $R_g=10{,}000$ ohms Assume further the following circuit capabilities: The pulse stretching network is to be designed for maximum pulse-to-D.C. conversion. An over-all pulse-to-D.C. circuit gain of unity is desired to produce a 10 v. increase in the D.C. level at the integrator output due to the specified pulse train input. The desired integration time is $100\times10^{-3}$ seconds.

Performing the calculations indicated by the equations set forth above and assuming practical component types and values consistent with the chosen circuit capabilities, we may determine the following data:

Capacitor 12 $(C_1)=100\times10^{-12}$ farads
Diode 13=1N251
Resistance 14 $(R_f)=100$ ohms
Resistance 15 $(R_d)=10^6$ ohms
Tube 18 $(V_1)=\frac{1}{2}$ 6111 dual triode, operating point of 150 v. on the plate, 2 ma. plate current, grid bias of $-6$ v., $r_p=6000$ ohms, $\mu=18.5$.
Resistor 23 $(R_1)=3000$ ohms
Resistor 24 $(R_2)=7500$ ohms
Resistor 25 $(R_3)=62\times10^3$ ohms
Capacitor 26 $(C_2)=0.5\times10^{-6}$ farads
Gain $G_1=0.46$
Gain $G_2=2.2$
Integration time multiplying factor=3.2

Upon application of the specified input pulse train, $E_0$ rises from a static level of +15 v. to a level of +24 v. ($E_0=10$ v.) with a time constant of 100 msec.

With an input pulse 10, all the voltage drop due to $E_p$ appears instantaneously across resistor 11 and diode 13, although very little voltage, relatively speaking, appears across diode 13. With conduction of diode 13, the voltage at grid 21 drops slightly. However, as capacitor 12 begins to charge, the current through diode 13 decreases so that the voltage on grid 21 begins to rise. When input pulse 10 returns positively to zero, the voltage on grid 21 momentarily rises very close to the total voltage on capacitor 12, which is substantially the sum of the static potential existing on its grid side plus the maximum amplitude of the negative input pulse 10. As capacitor 12 now begins to discharge through resistor 15, the voltage on grid 21 decays with the discharge of capacitor 12 until the arrival of the next negative input pulse 10. Meanwhile, of course, the rising grid voltage has caused tube 18 to conduct more heavily. This has resulted in an increase in the voltage at the junction of resistors 23 and 24. Current flow through resistor 25 as a result will increase the voltage on capacitor 26 and effectively a new static level is reached. Therefore, at the time of arrival of the next input pulse 10, the voltage on grid 21 now remains at a higher level corresponding to the new charge on capacitor 26. The voltage on grid 21 repeats the pattern described above from this new level. As this pattern is repeated with successive input pulses 10, the effective voltage on grid 21 increases exponentially, which explains the effective pulse-to-D.C. conversion accomplished by the pulse stretching means. A steady state condition is reached when capacitor 26 loses and gains equal amounts of charge during one pulse period.

The advantages claimed for this pulse integrator have been effectively demonstrated herein and constitute improvements unattainable in any other way known to the inventor. A passive network incorporating the functions of pulse stretching and pulse integration is hampered by the fact that it is impossible to vary any one parameter without at the same time affecting others and the only sense in which a passive circuit has "gain" is a pulse-to-D.C. conversion. It involves no true amplification such as accomplished with the present circuit. It may be noted further that the circuit of this invention is not merely a combination of a pulse stretcher, followed by a stage of amplification, followed by a final stage of pulse integration. It is rather a unique and economical composite of these three elements involving interactions of a subtle nature whose character can only be clearly understood by reference to the mathematical expressions as set forth above. This circuit will be found particularly useful in a variety of radar and telemetering systems employing pulse integration.

It may be noted that the invention is not limited to the use of a vacuum tube. Within the scope thereof one might well wish to substitute a transistor, for example, or other amplifying means making appropriate and obvious circuit adjustments therefor. Clearly all actual component values and tube characteristics are purely illustrative and within the limitations of this invention many other and distinct combinations may be adopted.

What is claimed is:

1. A pulse integrating circuit comprising input means for receiving unidirectional voltage pulses, an amplifier tube having at least an anode, a cathode and a control electrode, the anode being connected to a source of positive potential, a first and a second resistor connected in series between the cathode and ground potential, a pulse stretching capacitor having a first terminal connected to said control electrode and a second terminal connected to said input means, a pulse integrating capacitor, a diode and a third resistor connected in parallel between the first terminal of said pulse stretching capacitor and a first terminal of said pulse integrating capacitor, the second terminal of said pulse integrating capacitor being connected to ground, said diode being oriented with its positive current conducting direction from the first terminal of said pulse integrating capacitor to the first terminal of said pulse stretching capacitor, a fourth resistor connected between the first terminal of said pulse integrating capacitor and the junction of said first and second resistors, and voltage output means connected between said first terminal of said pulse integrating capacitor and ground.

2. A pulse integrating circuit as claimed in claim 1 wherein said fourth resistor is continuously variable.

References Cited by the Examiner

UNITED STATES PATENTS

| | | | |
|---|---|---|---|
| 2,505,549 | 4/50 | Jones | 328—128 |
| 2,999,925 | 9/61 | Thomas | 328—127 |
| 3,028,553 | 4/62 | Richter | 328—58 |
| 3,075,148 | 1/63 | Faust | 328—58 |

FOREIGN PATENTS

| | | |
|---|---|---|
| 560,200 | 12/44 | Great Britain. |

JOHN W. HUCKERT, *Primary Examiner.*